F. F. WEAR.
COMBINED COFFEE GRINDER AND CLEANER.
APPLICATION FILED SEPT. 8, 1909.
989,217.
Patented Apr. 11, 1911.
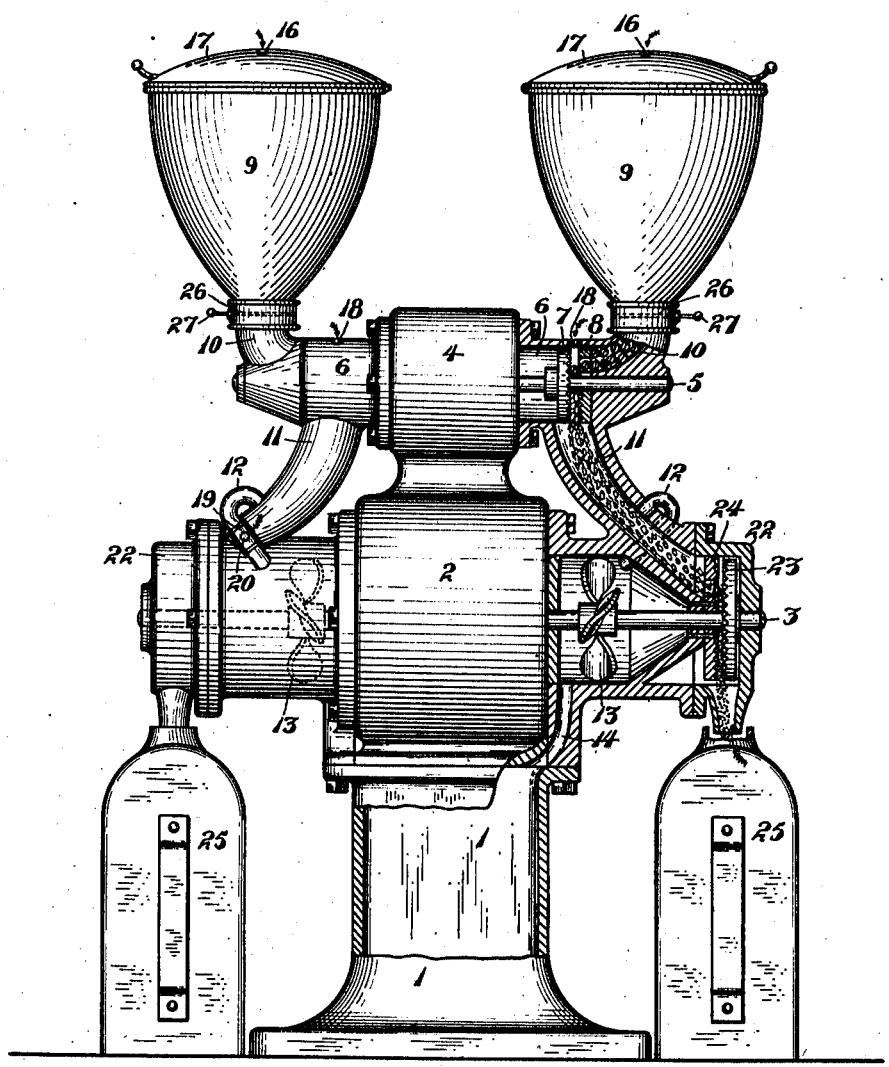
WITNESSES
INVENTOR
Frank F. Wear
BY
F. M. Wright.
ATTORNEY

UNITED STATES PATENT OFFICE.

FRANK F. WEAR, OF SAN FRANCISCO, CALIFORNIA.

COMBINED COFFEE GRINDER AND CLEANER.

989,217.  Specification of Letters Patent.  Patented Apr. 11, 1911.

Application filed September 8, 1909. Serial No. 516,696.

*To all whom it may concern:*

Be it known that I, FRANK F. WEAR, a citizen of the United States, residing at San Francisco, in the county of San Francisco and State of California, have invented new and useful Improvements in Combined Coffee Grinders and Cleaners, of which the following is a specification.

The object of the present invention is to provide a combined coffee grinder and cleaner so that in grinding the coffee, the chaff of the coffee berry, and also particles of soil, dust, or dirt, in general, may be removed therefrom.
In the accompanying drawing, the figure is a front view of my improved coffee grinder, certain parts being shown in vertical section.

Referring to the drawing, 1 indicates a base, upon which is mounted a casing 2 of an electric motor having a shaft 3. Upon the casing 2 is mounted the casing 4 of a second electric motor having a shaft 5. The shaft 5 extends at both ends into breaking chambers 6, and carries within the breaking chamber at each end a breaking disk 7, arranged to break the coffee against a stationary breaking disk 8. The coffee to be ground is at each end placed in a glass receiver 9, from which it drops by a passage 10 to the breaking chamber 6. The lower ends of said receivers may be closed by shutters 26 in the receivers themselves, controlled by handles 27, so that if a receiver be raised from its supports the contained coffee is retained therein, the shutter being closed. Heretofore the closure has been in the machine itself, so that, if the receiver is raised when coffee is contained therein, the coffee is spilled around the machine.

The two breaking disks at each end break the coffee into coarse particles and thereby release therefrom the chaff and also loosen the dust or soil, which has heretofore clung to the berry. These pieces of the berry, together with the chaff, dust and the like, drop from each breaking chamber by a conduit 11, but, in passing down said conduit, they pass the entrance to a pipe 12, which pipes 12 lead from the two conduits 11 to suction fans 13 on the shaft 3 of the lower electric motor, which fans, by suction, withdraw from the conduit 11 the lighter particles of chaff, dust and the like, and thus separate them from the particles of the coffee berry, and clean the latter. Said lighter particles are discharged by conduits 14 into the hollow base 1, which can be removed and emptied from time to time. Of the material passing down said conduits 11, the heavier particles, namely, the pieces of broken coffee berries, pass into grinding chambers 22, in each of which is a grinding disk 23 upon the shaft 3, grinding the particles against a stationary grinding disk 24, secured within the casing of the grinding chamber. The finely ground particles of coffee drop into a receptacle 25 from which they can be removed after the grinding is completed.

The air sucked through the pipes 12 is supplied through apertures 16 in the lids 17 of the receivers 9, and also through apertures 18 in the breaking chambers. The suction from said breaking chambers can be regulated by sleeves 19 over the pipes 12, having apertures 20 which can be caused to register with apertures in said pipes 12, so as to permit the air to pass therethrough instead of through the apertures 16, 18.

I am aware that it is a common practice in flour mills to separate fine from coarse particles by drawing the former through a screen by pneumatic suction. Such a method however would be inapplicable for the purpose for which my machine is devised, for the reason that the light particles of chaff are as large as, and even larger than, many of the particles in broken coffee. Consequently a mere suction through a sieve would remove, not only the light particles of chaff, but also some of the particles of the broken coffee. For separating the chaff from the broken coffee, I do not depend upon any sieve, but entirely upon the two opposing forces, namely, the force of gravity which tends to carry the broken particles of coffee and the chaff downward, and an upward suction, which can more than neutralize the weight of the chaff, but not that of the broken coffee. It is therefore necessary, first, that the conduit should have a downward inclination steep enough to permit the coffee and chaff to fall by gravity; second, that the suction tube should have an inclination directed more upwardly than that of the conduit through which the particles fall; and, third, that the entrance to said suction tube should be unobstructed. However, by the word "unobstructed," here and in the claims, is not meant that the opening may not be divided by cross bars or other means into separate ports, but that, if so divided, each of said ports shall be sufficiently large to permit, not only the particles of chaff, but also the particles of broken coffee, to pass therethrough.

I claim:—

1. The combination of a receptacle, a motor casing supported therein, a motor in said casing having a shaft extending in both directions therefrom, a second casing mounted upon the first casing, a motor in the second casing also having a shaft extending in both directions therefrom, a breaker on each end of the shaft of the upper motor, a grinder on each end of the shaft on the lower motor, a conduit leading to each breaker for feeding material thereto, a conduit leading from each breaker to the corresponding grinder, suction apparatus on one of said shafts, and means for conducting to said suction apparatus light material from the last named conduits, substantially as described.

2. The combination of a receptacle, a motor casing supported therein, a motor in said casing having a shaft extending in both directions therefrom, a second casing mounted upon the first casing, a motor in the second casing also having a shaft extending in both directions therefrom, a breaker on each end of the shaft of the upper motor, a grinder on each end of the shaft on the lower motor, a conduit leading to each breaker for feeding material thereto, a conduit leading from each breaker to the corresponding grinder, suction fans on one of said shafts and conduits leading to the said fans from the last named conduits respectively, substantially as described.

In testimony whereof I have hereunto set my hand in the presence of two subscribing witnesses.

FRANK F. WEAR.

Witnesses:
FRANCIS M. WRIGHT,
D. B. RICHARDS.